Dec. 19, 1933.        R. A. JOHNSON        1,939,982
METHOD AND MEANS FOR CASTING BEARING ELEMENTS
Filed Oct. 12, 1931
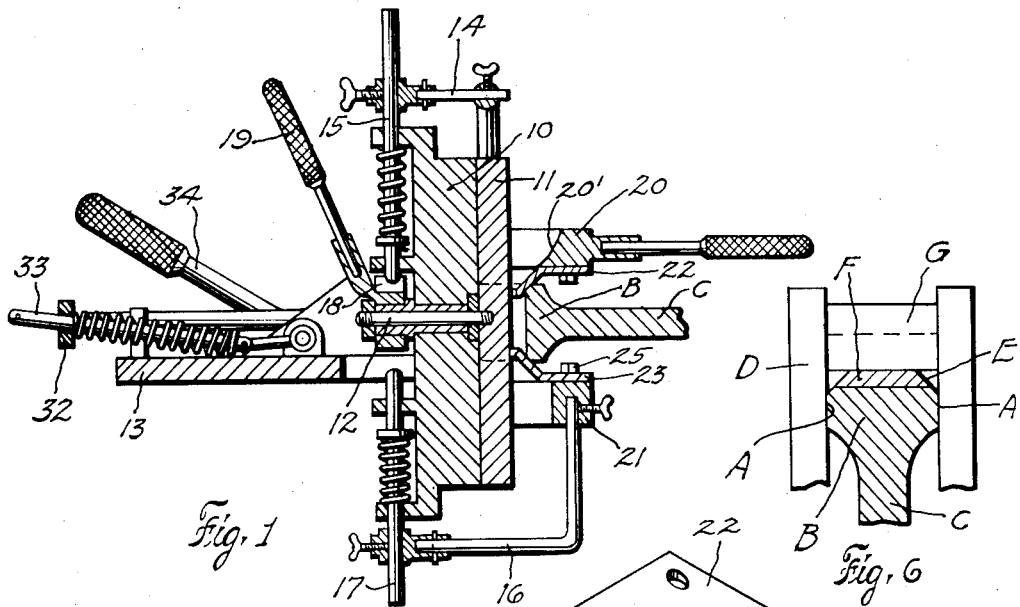
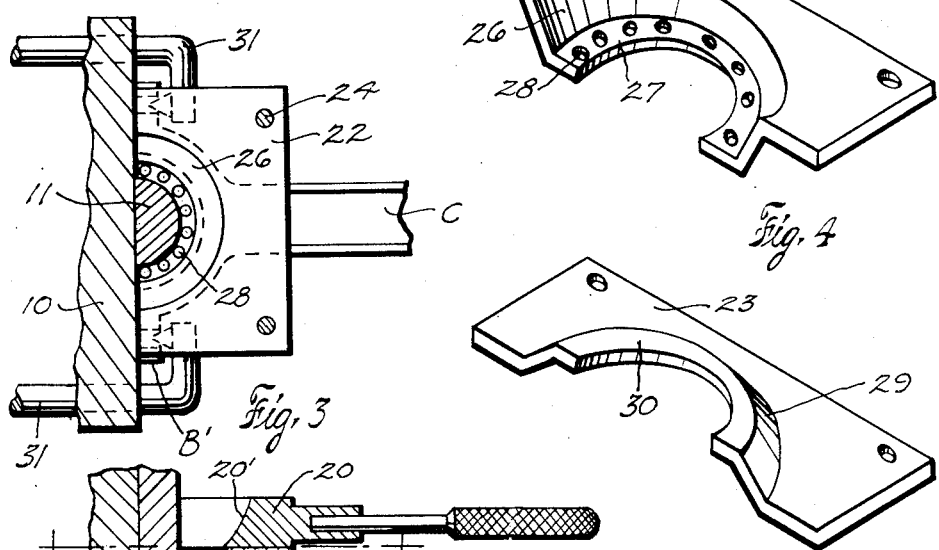
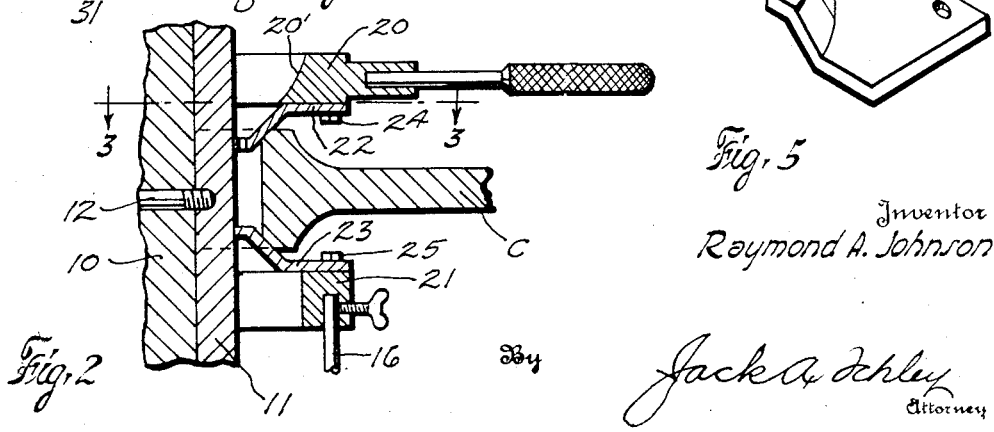
Inventor
Raymond A. Johnson
By Jack A. Ashley
Attorney Patented Dec. 19, 1933

1,939,982

UNITED STATES PATENT OFFICE 1,939,982

METHOD AND MEANS FOR CASTING BEARING ELEMENTS

Raymond A. Johnson, Dallas, Tex., assignor, by mesne assignments, to Gena Scarbrough, Dallas County, Tex.

Application October 12, 1931. Serial No. 568,330

4 Claims. (Cl. 22—58)

This invention relates to new and useful improvements in methods and means for casting bearing elements.

One object of the invention is to provide an improved method and means for re-babbitting or casting bearing elements and confining the bearing metal to the bearing area of the bearing member and thereby preventing it overflowing onto working parts and obviating the necessity of grinding or machining the member to remove surplus bearing metal and also protecting highly polished or glazed surfaces from defacement.

Another object of the invention is to provide means for engaging an arcuate bearing member having beveled edges and arranged to receive and confine the bearing metal, when the latter is poured, to the bearing area of said member, as well as to produce beveled edges on the bearing element flush with the beveled edges of the member without grinding or machining.

Still another object of the invention is to provide improved means for casting bearing elements on beveled arcuate bearing members in an economical and expeditious manner and at the same time protecting polished and glazed surfaces of said member.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a vertical sectional view of a device having means constructed in accordance with the invention for producing bearing elements, Figure 2 is an enlarged vertical section of a portion of the same, Figure 3 is a horizontal cross-sectional view taken on the line 3—3 of Figure 2, Figure 4 is a perspective view of the upper casting plate, Figure 5 is a perspective view of the lower casting plate, and Figure 6 is a diagrammatical view showing a connecting rod in position on its crank shaft.

In certain types of motors and other devices having crank shafts, it has become the practice to machine the sides A of the bearing member B of each connecting rod C. These surfaces are highly polished and coact with the machined sides of the cheeks D of the crank shaft. The allotted clearances between the polished sides A and the sides of the cheeks D must be maintained in order to eliminate excess play. In this type of connecting rod an arcuate bearing element F formed of babbitt, alloy, or any other bearing metal, is cast upon the inner periphery of the member B and both the element F and the member B are formed with beveled edges E. The bearing F contacts only with the pin G of the crank shaft and is spaced from the cheeks D.

In the original production of the connecting rods the bearing element F is cast upon the member B and the latter is then machined and finished, whereby the polished and glazed surfaces are produced and the bevels E are formed. Where through use or lack of lubrication the bearing element F is worn out or is overheated, it becomes necessary to replace it. It is the common practice to cast the bearing metal on the curved periphery of the member B and allow it to overflow onto the bevels E and the sides A. The parts are then machined or ground so as to finish the bearing element. It will be seen that it is almost impossible to remove the surplus bearing metal without defacing the sides A and the bevels E. It has long been the practice to flange the bearing metal on each side of the bearing member and these flanges contacted the cheeks D instead of the sides A.

In carrying out the invention I provide a suitable support which includes a head 10 and a semicircular upright facing strip 11, which is secured to the support by a pin 12. The particular supporting apparatus is not essential and may be of any suitable design. The support 10 is suitably secured to a frame 13. An upper hanger 14 includes a spring pressed plunger 15 slidable on the support. A lower hanger 16 includes a spring pressed plunger 17 slidably mounted on the support. These plungers are adapted to engage an eccentric 18 journaled on the pin 12 and operated by a hand lever 19. The upper hanger 14 has a removable gate 20 suitably mounted thereon, while a flask member 21 is mounted on the hanger 16. No attempt has been made to describe the details of these parts because the same are in common use.

The face strip 11 has its arcuate surface formed on the radius upon which it is desired to cast the inner perimeter of the bearing element. In order to properly shape the bearing element F and to protect the bevels E and the sides A, I provide an upper casting plate 22 and a lower casting plate 23. The upper plate 22 is secured to the under side of the gate 20 by bolts 24, while the plate 23 is secured to the upper side of the member 21 by bolts 25. The upper plate 22 is formed with an arcuate and downwardly inclined collar 26. At the lower end of this collar an inwardly directed horizontal flange 27 is provided. This flange is formed with a plurality of spaced apertures or holes 28. The plate 23 is provided with an upwardly inclined arcuate collar 29 and an inwardly directed horizontal arcuate flange 30 similar to the flange 27, except that it is imperforate.

When the plates are in position their flanges 27 and 30 engage the face of the strip 11 and form a fluid-tight joint therewith. The size, shape and finish of the lower surfaces of the collar 26 and the flange 27 and of the upper surfaces of the collar 29 and the flange 30 are very important and must be such as to exactly fit the bevels E and produce the bearing element F.

The connecting rod C may be supported in any suitable manner with its bearing member B between the plates 22 and 23 and its bevels E engaging the collars 27 and 29. I have shown clamping members 31 engaging in the bolt holes of the lugs B' of the connecting rod and these members are connected with a bridle 32 mounted on a spring plunger 33 which is operated by a handle lever 34, which is swung to set or release said member.

With the connecting rod C held in place, the molten bearing metal is poured into the sump 20' of the gate 20 from which it flows down the collar 26 and through the holes 28 into the space defined by the plates 22 and 23, the facing strip 11, and the bearing member B of the rod. It will be noted that the inclined collars overhang the inner periphery of the bearing member B and thus form the continuations of the bevels E at each edge of the bearing element F.

When the bearing element has been cast the handle 34 is swung to release the clamps 31 and free the connecting rod C. The flanges 27 and 30 provide for a surplus of the cast bearing element. It will be seen that the bevels E of the head B and the polished sides A will be free from cast metal and in order to complete the forming or reforming of the bearing element F it is merely necessary to grind or cut away the surplus metal until the proper radius is obtained. No polishing, grinding or machining of either the bevels or the sides is necessary and these parts are preserved with their original size, finish and clearances.

It will be obvious that the work is easily and readily accomplished. It is also pointed out that the method is economical because a minimum amount of surplus metal is used. The device may be quickly made ready for casting by simply placing the plates 22 and 23 in place and may be as quickly disassembled.

Various changes in the size and shape of the different parts, as well as modifications and alterations, may be made within the scope of the appended claims.

Having illustrated and described a preferred form of the invention, what I claim, is:

1. The method of casting bearing elements on the bearing ends of connecting rods having beveled edges and polished sides, which consists in shielding the sides and bevels of said bearing end, and pouring bearing metal against said end and between said shields and confining it from said edges and sides.

2. The method of casting bearing elements on the bearing ends of connecting rods having beveled edges and polished sides, which consists in pouring bearing metal against the bearing end of the rod between its bevels, and protecting said bevels and said polished sides from the bearing metal overflowing the same.

3. In a device for casting bearing metal on bearing members, a support, a pair of casting plates each including an inclined arcuate collar and an arcuate horizontal flange extending from said collar, one of the flanges having metal admitting holes, and a facing member engaging the flanges and extending therebetween.

4. A metal casting device including molding members having arcuate beveled portions for engaging the beveled and polished ends of bearing heads and protecting the same, a curved support extending axially of said arcuate portions, and perforated arcuate flanges projecting from said beveled portions and engaging the curved surface of said support.

RAYMOND A. JOHNSON.